US012794075B2

(12) United States Patent
Qiu et al.

(10) Patent No.: US 12,794,075 B2
(45) Date of Patent: Nov. 10, 2026

(54) BATTERY BOX BODY AND BATTERY MODULE

(71) Applicant: EVE POWER CO., LTD., Jingmen (CN)

(72) Inventors: Wencong Qiu, Jingmen (CN); Fan Li, Jingmen (CN); Zhiwei Chen, Jingmen (CN); Chaohai Chen, Jingmen (CN); Yanqiang Feng, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 902 days.

(21) Appl. No.: 18/002,787

(22) PCT Filed: Sep. 22, 2022

(86) PCT No.: PCT/CN2022/120392
§ 371 (c)(1),
(2) Date: Dec. 21, 2022

(87) PCT Pub. No.: WO2023/173714
PCT Pub. Date: Sep. 21, 2023

(65) Prior Publication Data

US 2024/0120611 A1 Apr. 11, 2024

(30) Foreign Application Priority Data

Apr. 20, 2022 (CN) ......................... 202210419599.7
Apr. 20, 2022 (CN) ......................... 202220922973.0

(51) Int. Cl.
*H01M 50/367* (2021.01)
*H01M 50/204* (2021.01)
(Continued)

(52) U.S. Cl.
CPC ....... *H01M 50/367* (2021.01); *H01M 50/224* (2021.01); *H01M 50/383* (2021.01); *H01M 50/204* (2021.01); *H01M 50/289* (2021.01)

(58) Field of Classification Search
CPC .......................... H01M 50/367; H01M 50/204
See application file for complete search history.

(56) References Cited

U.S. PATENT DOCUMENTS

2023/0101256 A1* 3/2023 Han .................... H01M 50/291 429/120
2023/0231260 A1* 7/2023 Hu ...................... H01M 10/625 429/53

FOREIGN PATENT DOCUMENTS

CN 111416082 A 7/2020
CN 214153046 U 9/2021
(Continued)

OTHER PUBLICATIONS

International Search Report in International application No. PCT/CN2022/120392, mailed on Jan. 18, 2023.
(Continued)

*Primary Examiner* — Maria Laios
(74) *Attorney, Agent, or Firm* — PV IP PC; Wei Te Chung

(57) ABSTRACT

The present application provides a battery box body and a battery module. The battery box body incudes a base plate assembly and a side beam assembly, where the base plate assembly is divided into a first region and a second region. Where a first pressure relief cavity is defined by an outer plate and an inner plate of the base plate assembly, the battery cells are occluded on a portion of a cavity wall of the first pressure relief cavity. A second pressure relief cavity is defined by the support plate and the inner plate, and other portion of the cavity wall of the first pressure relief cavity is communicated with the second pressure relief cavity. A third
(Continued)

pressure relief cavity is defined by an inner cavity of the side beam assembly, the side beam assembly is installed with a pressure relief valve communicated with the third pressure relief cavity.

20 Claims, 3 Drawing Sheets

(51) Int. Cl.

| | |
|---|---|
| ***H01M 50/224*** | (2021.01) |
| ***H01M 50/289*** | (2021.01) |
| ***H01M 50/383*** | (2021.01) |

(56) References Cited

FOREIGN PATENT DOCUMENTS

| | | | |
|---|---|---|---|
| CN | 113540683 | A | 10/2021 |
| CN | 214378654 | U | 10/2021 |
| CN | 113725551 | A | 11/2021 |
| CN | 114006124 | A | 2/2022 |
| CN | 114784450 | A | 7/2022 |

OTHER PUBLICATIONS

Written Opinion of the International Search Authority in International application No. PCT/CN2022/120392, mailed on Jan. 18, 2023.

* cited by examiner

BATTERY BOX BODY AND BATTERY MODULE

CROSS-REFERENCE TO RELATED APPLICATIONS

This application is a national stage of International Application No. PCT/CN2022/120392, filed on Sep. 22, 2022, which claims priority to Chinese Patent Application No. 202210419599.7, filed on Apr. 20, 2022. The aforementioned application is hereby incorporated by reference in its entirety.

TECHNICAL FIELD

The present application relates to the field of power batteries, for example, to a battery box body and a battery module.

BACKGROUND

A battery box body of a large cylindrical battery includes an accommodating cavity configured to accommodate battery cells, and is provided with a pressure relief valve. When a thermal runaway occurs in the battery cells, substances enter the pressure relief valve from the accommodating cavity. A pressure relief path is relatively short, and cooling effect is not ideal during a pressure relief process. High-temperature substances sprayed are easy to burn and heat spread, resulting in fire hazards.

SUMMARY

The present application provides a battery box body and a battery module to reduce a temperature of high-temperature substances, so that the temperature of the high-temperature substances is lower than an ignition point when the high-temperature substances reach at a pressure relief valve, thereby preventing from firing and improving safety and reliability.

A battery box body is provided, including a base plate assembly and a side beam assembly disposed surrounding the base plate assembly, where the base plate assembly is divided into a first region and a second region, battery cells are disposed in the first region, and a support plate is disposed in the second region;

- the base plate assembly includes an outer plate and an inner plate, a first pressure relief cavity is defined by the outer plate and the inner plate, and the battery cells are occluded on a portion of a cavity wall of the first pressure relief cavity;
- a second pressure relief cavity is defined by the support plate and the inner plate, and other portion of the cavity wall of the first pressure relief cavity is communicated with the second pressure relief cavity; and
- a third pressure relief cavity is defined by an inner cavity of the side beam assembly, the second pressure relief cavity is communicated with the third pressure relief cavity, and the side beam assembly is stalled with a pressure relief valve communicated with the third pressure relief cavity.

A battery module is provided, including battery cells and the battery box body mentioned above, wherein the battery cells are disposed in the first region.

1. Base plate assembly; 11. Outer plate; 12. Inner plate; 121. Carrier plate; 1211. First through hole; 122. Spacing plate; 13. Strainer plate; 1A. First pressure relief cavity;

2. Side beam assembly; 21. Isolation wall; 22. First side beam; 23. Second side beam; 231. Horizontal side beam; 2311. Pressure relief valve; 232. Vertical side beam; 24. Third side beam; 25. Fourth side beam; 2A. Third pressure relief cavity;

3. Support plate; 3A. Second pressure relief cavity;

4. Pressure relief valves; 5. Connection plate; 6. Fastener; 7. Fixing member;

8. First crossbeam; 9. Second crossbeam;

M. First region; N. Second region.

DETAILED DESCRIPTION OF THE EMBODIMENT

The technical solutions in the embodiments of the present application will be described hereafter with reference to the accompanying drawings, the described embodiments are only a part of embodiments of the present application.

In description of the present application, unless otherwise specified and defined, terms "connected with", "connected" and "fixed" should be understood in a broad sense, for example, it may be a fixed connection, a detachable connection, or a whole; it may be a mechanical connection or an electrical connection; it may be a directly connection or an indirectly connection through an intermediate media; and it may be an internal connection of two components or an interaction relationship between two components. For those skilled in the art, meanings of the above terms in the present application can be understood according to situations.

In the present application, unless otherwise specified and defined, a first feature is disposed "on" or "under" a second feature may include a direct contact between the first feature and the second feature, or a contact between the first feature and the second feature through other features rather than the direct contact. Moreover, that the first feature is disposed "up", "above" and "on" the second feature includes that the first feature is right above or obliquely above the second feature, or only indicate that a horizontal height of the first feature is greater than a horizontal height of the second feature. That the first feature is disposed "under", "below", or "underneath" of the second feature include that the first feature is right below or obliquely below the second feature, or only indicate that the horizontal height of the first feature is less than the horizontal height of the second feature.

The embodiment provides a battery module, including an electrical component, battery cells, and a battery box body. Both the electrical component and the battery cells are accommodated in the battery box body. In order to prevent individual battery cell in the battery module from runaway to damage other battery cells, the electrical component, and control systems, etc., the embodiment provides a battery box body.

Figure 1:
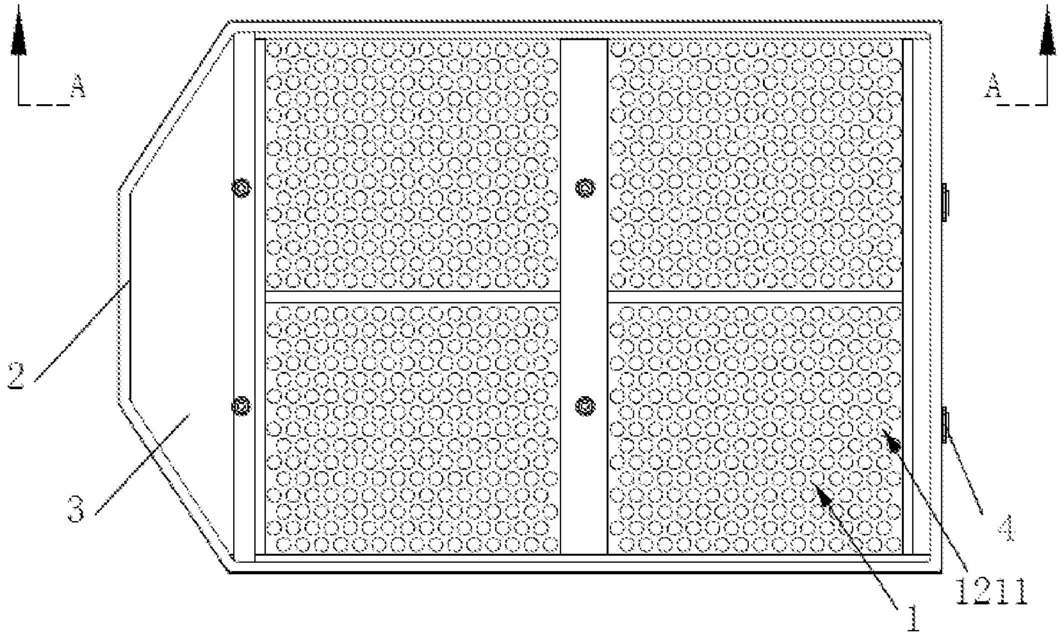
FIG. 1 is a schematic structural view of a battery box body in a view angle provided by an embodiment of the present application.
Figure 2:
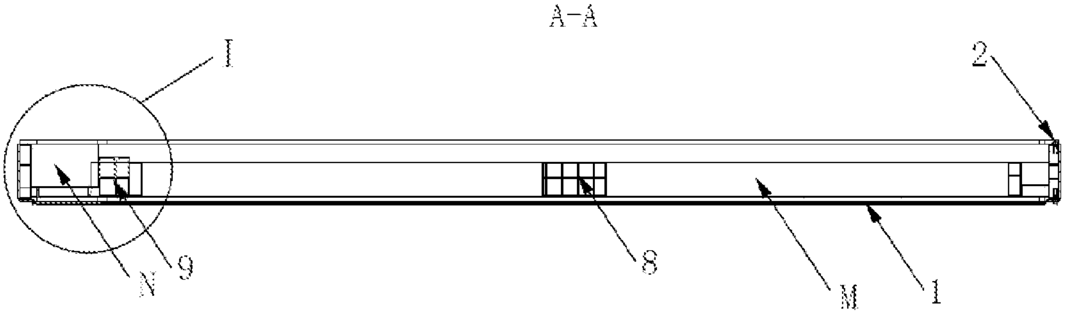
FIG. 2 is a cross-sectional view in A-A direction of FIG. 1.
Figure 3:
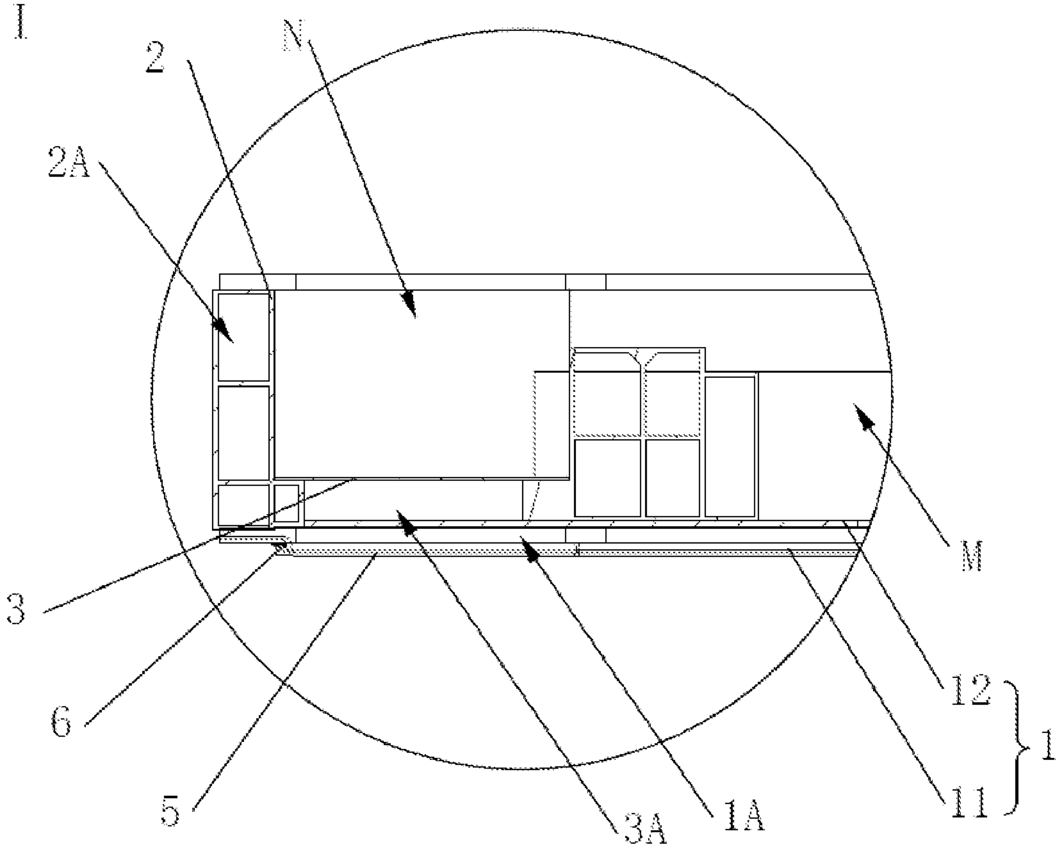
FIG. 3 is an enlarged view at I of FIG. 2.

As shown in FIG. 1 to FIG. 3, the battery box body includes a base plate assembly 1 and a side beam assembly 2 disposed surrounding the base plate assembly 1, where the base plate assembly 1 is divided into a first region M and a second region N, the battery cells are disposed in the first region M, and a support plate 3 is disposed in the second region N. The base plate assembly 1 includes an outer plate 11 and an inner plate 12, where a first pressure relief cavity 1A is defined by the outer plate 11 and the inner plate 12, the battery cells are occluded on a portion of a cavity wall of the first pressure relief cavity 1A. A second pressure relief cavity 3A is defined by the support plate 3 and the inner plate 12, and other portion of the cavity wall of the first pressure relief cavity 1A is communicated with the second pressure relief cavity 3A. A third pressure relief cavity 2A is defined by an inner cavity of the side beam assembly 2, the second pressure relief cavity 3A is communicated with the third pressure relief cavity 2A, and the side beam assembly 2 is installed with a pressure relief valve 4 communicated with the third pressure relief cavity 2A.

When a thermal runaway occurs in one or more of the battery cells, high-temperature substances sprayed from the battery cells where the thermal runaway occurs are diffused in the first pressure relief cavity 1A, and a first pressure relief layer formed by the first pressure relief cavity 1A is separated from a battery cell layer where the battery cells are located, so as to ensure that other battery cells on an upper layer of the inner plate 12 are not affected during a pressure relief process, thereby preventing other battery cells from being affected. A pressure relief channel is defined by the first pressure relief cavity 1A, the second pressure relief cavity 3A, and the third pressure relief cavity 2A, and after passing through the pressure relief channel, the high-temperature substances are relieved through a pressure relief valve 4. When the high-temperature substances pass through the first pressure relief cavity 1A, the second pressure relief cavity 3A, and the third pressure relief cavity 2A, three pressure relief cavity structures respectively take away a large amount of heat to form three times of cooling, and when the high-temperature substances reach at the pressure relief valve 4 of the box body, a temperature of the high-temperature substances are lower than an ignition point to prevent fire, which is more safe and reliable.

Figure 4:
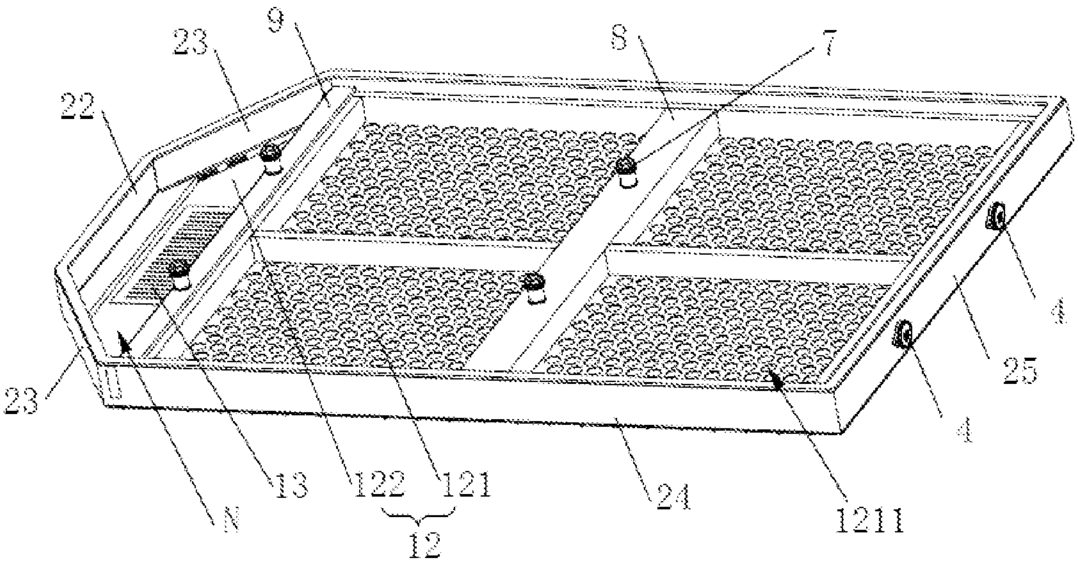
FIG. 4 is a schematic structural view of a battery box body in another view angle provided by an embodiment of the present application.

As shown in FIG. 4, the inner plate 12 includes a carrier plate 121 and a spacing plate 122, where each of the battery cells is occluded at a side of a corresponding one of first through hole 1211 defined in the carrier plate 121, and the high-temperature substances sprayed from the battery cells where the thermal runaway occurs enter the first pressure relief cavity 1A through the first through holes 1211 and are diffused, so as to realize that the first pressure relief cavity 1A is separated from the battery cells. In the embodiment, the battery cells are cylindrical battery cells, the first through holes 1211 are circular holes, a bottom area of each of the cylindrical battery cells is not less than a cross-sectional area of a corresponding one of the first through holes 1211, to ensure that the high-temperature substances enter the first pressure relief cavity 1A as much as possible, and to prevent leakage of the substances from affecting other battery cells. A plurality of first through holes 1211 are disposed in the carrier plate 121 and arranged in a form such as a plurality of rows or a matrix, so that the carrier plate 121 is a honeycomb plate.

In other embodiments, the battery cells may also be square battery cells, etc., and structures such as the carrier plate 121 and the first through holes 1211 may be disposed accordingly, the embodiment is not limited thereto.

As shown in FIG. 3 and FIG. 4, the second pressure relief cavity 3A is defined by the spacing plate 122 and the support plate 3, and the first pressure relief cavity 1A is communicated with the second pressure relief cavity 3A through second through holes defined in the spacing plate 122. A strainer plate 13 is disposed on the second through holes defined in the spacing plate 122, and a plurality of smaller holes are defined on the strainer plate 13 to prevent large particulate substances from entering the second pressure relief cavity 3A, thereby preventing the pressure relief channel from being blocked by the high-temperature substances sprayed from the battery cells, and resulting in unsmooth pressure relief. The high-temperature substances are filtered through the strainer plate 13, and the strainer plate 13 may be replaced periodically in a later period. In the embodiment, a phase change material layer is affixed on the strainer plate 13, and the temperature of the high-temperature substances may be reduced through the phase change material layer.

The outer plate 11 is a steel plate with a high melting point, is not easy to melt, and may reduce the temperature of the high-temperature substances.

Figure 5:
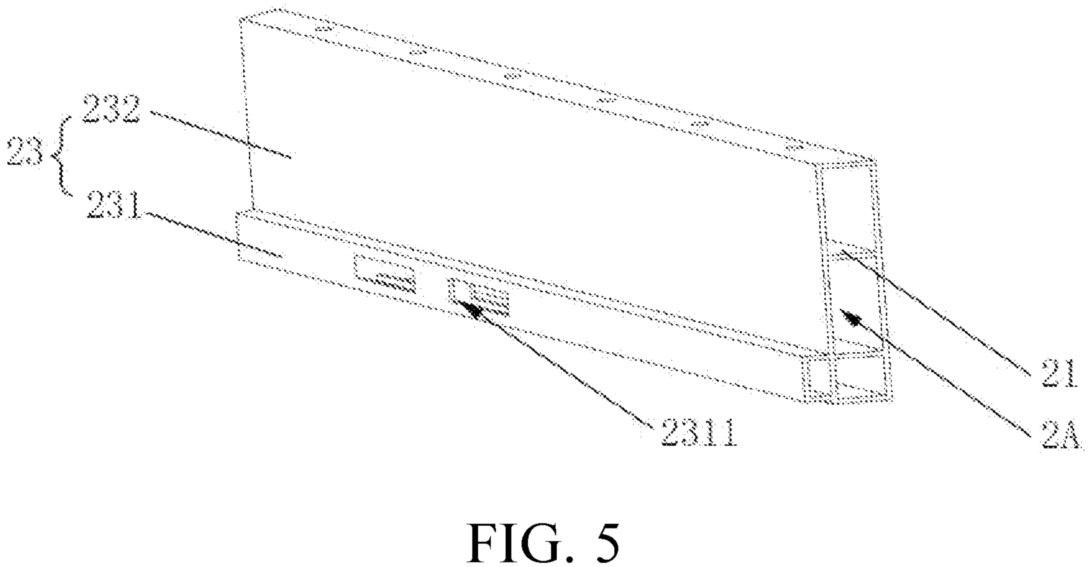
FIG. 5 is a schematic structural view of a second side beam provided by an embodiment of the present application.

As shown in FIG. 5, isolation walls 21 are disposed in the third pressure relief cavity 2A, so that the third pressure relief cavity 2A includes a plurality of cavities communicated with each other, and a plurality of isolation walls 21 may be arranged in parallel and at intervals to form an s-shaped cavity. Alternatively, the plurality of isolation walls 21 are arranged at intervals, and the isolation walls 21 may have included angles to form the plurality of cavities, holes are defined in the isolation walls 21, and the cavities are communicated with each other. Alternatively, the plurality of isolation walls 21 are disposed with different shapes, such as one or a combined shape of T-shaped, L-shaped, a plurality of continuous L-shaped, cross-shaped, and concave-shaped, etc., so that the third pressure relief cavity 2A forms a "labyrinth" cavity structure, and a structural shape and a splicing shape of the isolation walls 21 may be referred to related art to form a labyrinth with a simple shape or a complex shape, the embodiment is not limited thereto. When the high-temperature substances flow in the third pressure relief cavity 2A, a length of the third pressure relief cavity 2A is increased, and pressure relief time is prolonged, thereby reducing the temperature of the high-temperature substances.

As shown in FIG. 4 and FIG. 5, a cross section of the second region N is an isosceles trapezoid, the side beam assembly 2 includes a first side beam 22 and second side beams 23 symmetrically communicated with both ends of the first side beam 22, pressure relief holes 2311 are defined in the second side beams 22, and the second pressure relief cavity 3A is communicated with the third pressure relief cavity 2A through the pressure relief holes 2311. The pressure relief holes 2311 are defined on two symmetrical second side beams 23, the high-temperature substances are respectively output from the two second side beams 23 to two sides to disperse the high-temperature substances, which is beneficial to reduce the temperature.

As shown in FIG. 5, each of the second side beams 23 has an L-shaped cross section, and includes a horizontal side beam 231 and a vertical side beam 232 communicated with each other. The horizontal side beam 231 is located in the second region N, and the second pressure relief cavity 3A is communicated with the horizontal side beam 231. The length of the third pressure relief cavity 2A is prolonged by disposing the L-shaped side beam assembly 2. In the embodiment, the horizontal side beam 231 is provided with a plurality of cavities arranged along a horizontal direction, the vertical side beam 232 is provided with a plurality of cavities arranged along a vertical direction, and the isolation walls 21 are provided with openings to communicate between the cavities.

The two second side beams 23 are symmetrical along a symmetrical plane, two pressure relief valves 4 are provided and installed on the side beam assembly 2 and located at a side of the first region M away from the second region N to prolong a conveying path of the high-temperature substances, and the two pressure relief valves 4 are symmetrical along the symmetrical plane. That is, the two second side beams 23 and the two pressure relief valves 4 are symmetrical along the same symmetrical plane, so that pressure relief pressure of each of the two pressure relief valves 4 is reduced to improve reliability.

As shown in FIG. 4, the side beam assembly 2 further includes a fourth side beam 25 parallel to the first side beam 22, and a third side beam 24 to connect the second side beam 23 with the fourth side beam 25, where the pressure relief valve 4 is installed on the fourth side beam 25, and a output path of the high-temperature substances in the third pressure relief cavity 2A is defined by the second side beam 23, the third side beam 24, the fourth side beam 25, and the pressure relief valves 4 located on a corresponding side.

As shown in FIG. 3, the battery box body further includes a connection plate 5 and a fastener 6, where the fastener 6 passes through the connection plate 5, the base plate assembly 1, and the side beam assembly 2 in sequence, so that the connection plate 5, the base plate assembly 1, and the side beam assembly 2 are connected with each other.

As shown in FIG. 4, the battery box body further includes a first crossbeam 8, where the first crossbeam 8 is configured to divide the first region M into a plurality of installation regions, and each of the installation regions is configured to install a group of the battery cells, so that the battery cells are de-modular in groups, a number of components is reduced, and cost is reduced; and the first cross beam 8 is connected to the base plate assembly 1 and the side beam assembly 2 by a fixing member 7 to improve structural strength. The fixing member 7 may be a combination of a long screw and a nut, where the long screw penetrates through the base plate assembly 1 and the first cross beam 8, the nut abuts against a side of the base plate assembly 1 away from the first cross beam 8. In the embodiment, the first crossbeam 8 is a cross beam. In the embodiment, the cross beam divides the first region M into four installation regions to improve the structural strength. In other embodiments, a plurality of first crossbeams 8 may be provided to divide the first region M into eight installation regions or more. The plurality of first crossbeams 8 may be arranged in parallel and at intervals, so that the plurality of installation regions may be arranged in a row or a column according to usage requirements, the embodiment is not limited to thereto.

As shown in FIG. 4, the battery box body further includes a second crossbeam 9, where the second crossbeam 9 is provided to separate the first region M from the second region N, and the second region N is configured to install the electrical component, so as to prevent the electrical component, a control system and the like from being damaged when the thermal runaway occurs in the battery cells. Similarly, the second crossbeam 9 may also be connected to the base plate assembly 1 by the fixing member 7.

What is claimed is:

1. A battery box body, comprising a base plate assembly and a side beam assembly disposed surrounding the base plate assembly, wherein the base plate assembly is divided into a first region and a second region, battery cells are disposed in the first region, and a support plate is disposed in the second region;

wherein the base plate assembly comprises an outer plate and an inner plate, a first pressure relief cavity is defined by the outer plate and the inner plate, and the battery cells are occluded on a portion of a cavity wall of the first pressure relief cavity;

wherein the support plate is located on a side of the inner plate away from the outer plate and is arranged opposite to the inner plate, a second pressure relief cavity is defined by the support plate and a portion of the inner plate located in the second region, and other portion of the cavity wall of the first pressure relief cavity is communicated with the second pressure relief cavity; and wherein a third pressure relief cavity is defined by an inner cavity of the side beam assembly, the second pressure relief cavity is communicated with the third pressure relief cavity, and the side beam assembly is installed with a pressure relief valve communicated with the third pressure relief cavity.

2. The battery box body according to claim 1, wherein the inner plate comprises a carrier plate and a spacing plate, wherein each of the battery cells is occluded at a side of a corresponding one of first through holes defined in the carrier plate, the second pressure relief cavity is defined by the spacing plate and the support plate, and the first pressure relief cavity is communicated with the second pressure relief cavity through second through holes defined in the spacing plate.

3. The battery box body according to claim 2, wherein a strainer plate is disposed on the second through holes defined in the spacing plate.

4. The battery box body according to claim 3, wherein a phase change material layer is affixed on the strainer plate.

5. The battery box body according to claim 1, wherein the outer plate is a steel plate.

6. The battery box body according to claim 1, wherein isolation walls are disposed in the third pressure relief cavity, and configured to divide the third pressure relief cavity into a plurality of cavities communicated with each other.

7. The battery box body according to claim 1, wherein a cross section of the second region is an isosceles trapezoid, the side beam assembly comprises a first side beam and second side beams symmetrically communicated with both ends of the first side beam, pressure relief holes are defined in the second side beams, and the second pressure relief cavity is communicated with the third pressure relief cavity through the pressure relief holes.

8. The battery box body according to claim 7, wherein each of the second side beams has an L-shaped cross section and comprises a horizontal side beam and a vertical side beam communicated with each other, wherein the horizontal side beam is located in the second region, and the second pressure relief cavity is communicated with the horizontal side beam.

9. The battery box body according to claim 8, wherein two second side beams are symmetrical along a symmetrical plane, two pressure relief valves are provided, and installed on the side beam assembly and located at a side of the first region away from the second region, and the two pressure relief valves are symmetrical along the symmetrical plane.

10. The battery box body according to claim 1, further comprising a connection plate and a fastener, wherein the fastener passes through the connection plate, the base plate assembly, and the side beam assembly in sequence, and the fastener is configured to enable the connecting plate, the base plate assembly, and the side beam assembly to be connected with each other.

11. The battery box body according to claim 1, further comprising a first crossbeam, wherein the first crossbeam is configured to divide the first region into a plurality of installation regions, and each of the installation regions is configured to install a group of the battery cells.

12. The battery box body according to claim 11, wherein the first crossbeam is a cross beam.

13. The battery box body according to claim 1, further comprising a second crossbeam, wherein the second cross-beam is configured to separate the first region from the second region, and the second region is configured to install an electrical component.

14. A battery module, comprising battery cells and a battery box body, wherein the battery cells are disposed in a first region;

wherein the battery box body comprises a base plate assembly and a side beam assembly disposed surrounding the base plate assembly, wherein the base plate assembly is divided into the first region and a second region, the battery cells are disposed in the first region, and a support plate is disposed on the second region;

wherein the base plate assembly comprises an outer plate and an inner plate, wherein a first pressure relief cavity is defined by the outer plate and the inner plate, and the battery cells are occluded on a portion of a cavity wall of the first pressure relief cavity;

wherein the support plate is located on a side of the inner plate away from the outer plate and is arranged opposite to the inner plate, a second pressure relief cavity is defined by the support plate and a portion of the inner plate located in the second region, and other portion of the cavity wall of the first pressure relief cavity is communicated with the second pressure relief cavity; and wherein a third pressure relief cavity is defined by an inner cavity of the side beam assembly, the second pressure relief cavity is communicated with the third pressure relief cavity, and the side beam assembly is installed with a pressure relief valve communicated with the third pressure relief cavity.

15. The battery module according to claim 14, wherein the inner plate comprises a carrier plate and a spacing plate, wherein each of the battery cells is occluded at a side of a corresponding one of first through holes defined in the carrier plate, the second pressure relief cavity is defined by the spacing plate and the support plate, and the first pressure relief cavity is communicated with the second pressure relief cavity through second through holes defined in the spacing plate.

16. The battery module according to claim 15, wherein a strainer plate is disposed on the second through holes defined in the spacing plate.

17. The battery module according to claim 16, wherein a phase change material layer is affixed on the strainer plate.

18. The battery module according to claim 14, wherein the outer plate is a steel plate.

19. The battery module according to claim 14, wherein isolation walls are disposed in the third pressure relief cavity, and configured to divide the third pressure relief cavity into a plurality of cavities communicated with each other.

20. The battery module according to claim 14, further comprising an electrical component, wherein the electrical component is disposed on the support plate.

* * * * *